US007047194B1

(12) United States Patent
Buskies

(10) Patent No.: US 7,047,194 B1
(45) Date of Patent: May 16, 2006

(54) METHOD AND DEVICE FOR CO-ARTICULATED CONCATENATION OF AUDIO SEGMENTS

(76) Inventor: Christoph Buskies, Alsentrasse 21, 22769 Hamburg (DE)

( * ) Notice: Subject to any disclaimer, the term of this patent is extended or adjusted under 35 U.S.C. 154(b) by 0 days.

(21) Appl. No.: 09/763,149

(22) PCT Filed: Aug. 19, 1999

(86) PCT No.: PCT/EP99/06081

§ 371 (c)(1),
(2), (4) Date: Apr. 30, 2001

(87) PCT Pub. No.: WO00/11647

PCT Pub. Date: Mar. 2, 2000

(30) Foreign Application Priority Data

Aug. 19, 1998 (DE) ................................ 198 37 661

(51) Int. Cl.
*G10L 15/00* (2006.01)

(52) U.S. Cl. ....................................... 704/258; 704/260

(58) Field of Classification Search ................ 704/258, 704/260
See application file for complete search history.

(56) References Cited

U.S. PATENT DOCUMENTS 5,463,715 A * 10/1995 Gagnon ...................... 704/267
5,524,172 A 6/1996 Hamon
5,659,664 A 8/1997 Kaja

FOREIGN PATENT DOCUMENTS

DE 689 15 353 T2 7/1988
DE 693 18 209 T2 3/1992
EP 0 351 848 A2 1/1990
EP 0 813 184 A1 12/1997

OTHER PUBLICATIONS

Yiourgalis, N., et al, "A TtS System for the Greek Language Based on Concatenation of Formant Coded Segments", *Speech Communication*, (1990/1996), pp. 21-38.
Dettweiller, Heimut, et al., "Concatenation Rules for Demisyllable Speech Synthesis", *IEEE* (1985), pp. 19.11:1-19.11:4.

* cited by examiner

*Primary Examiner*—Daniel Abebe
(74) *Attorney, Agent, or Firm*—Hiscock & Barclay, LLP; Thomas R. FitzGerald, Esq.

(57) ABSTRACT

The invention provides a method, apparatus, and a computer program stored on a data carrier that generates synthesized acoustical data by concatenating audio segments of sounds to reproduce a sequence of concatenated sounds/phones. The invention has an inventory or sounds and each sound has three bands (FIG. 1*b*) including an initial co-articulation band, a solo articulation band and a final co-articulation band. The invention selects audio segments that end or begin with a co-articulation band and a solo articulation band of one sound. The instance of concatenation is defined by the co-articulation band and the solo articulation band of the one sound.

70 Claims, 13 Drawing Sheets

Figure 2A:
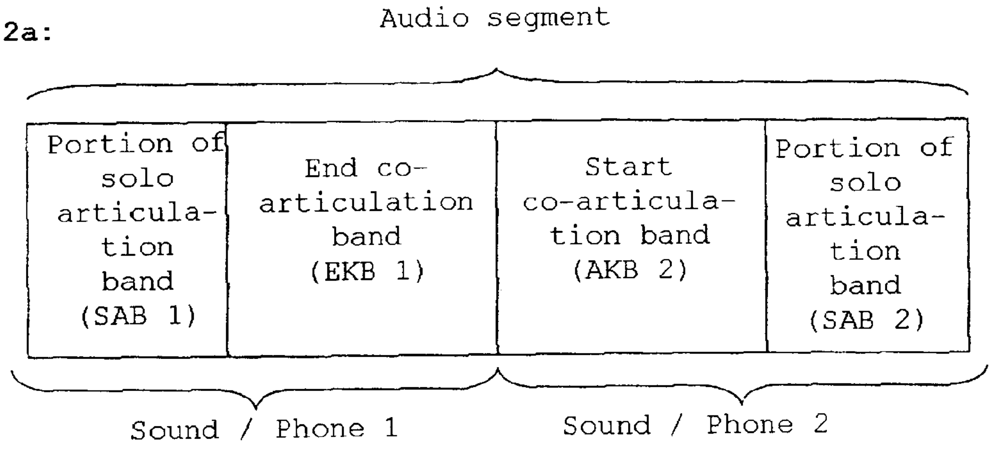

Figur 1a:
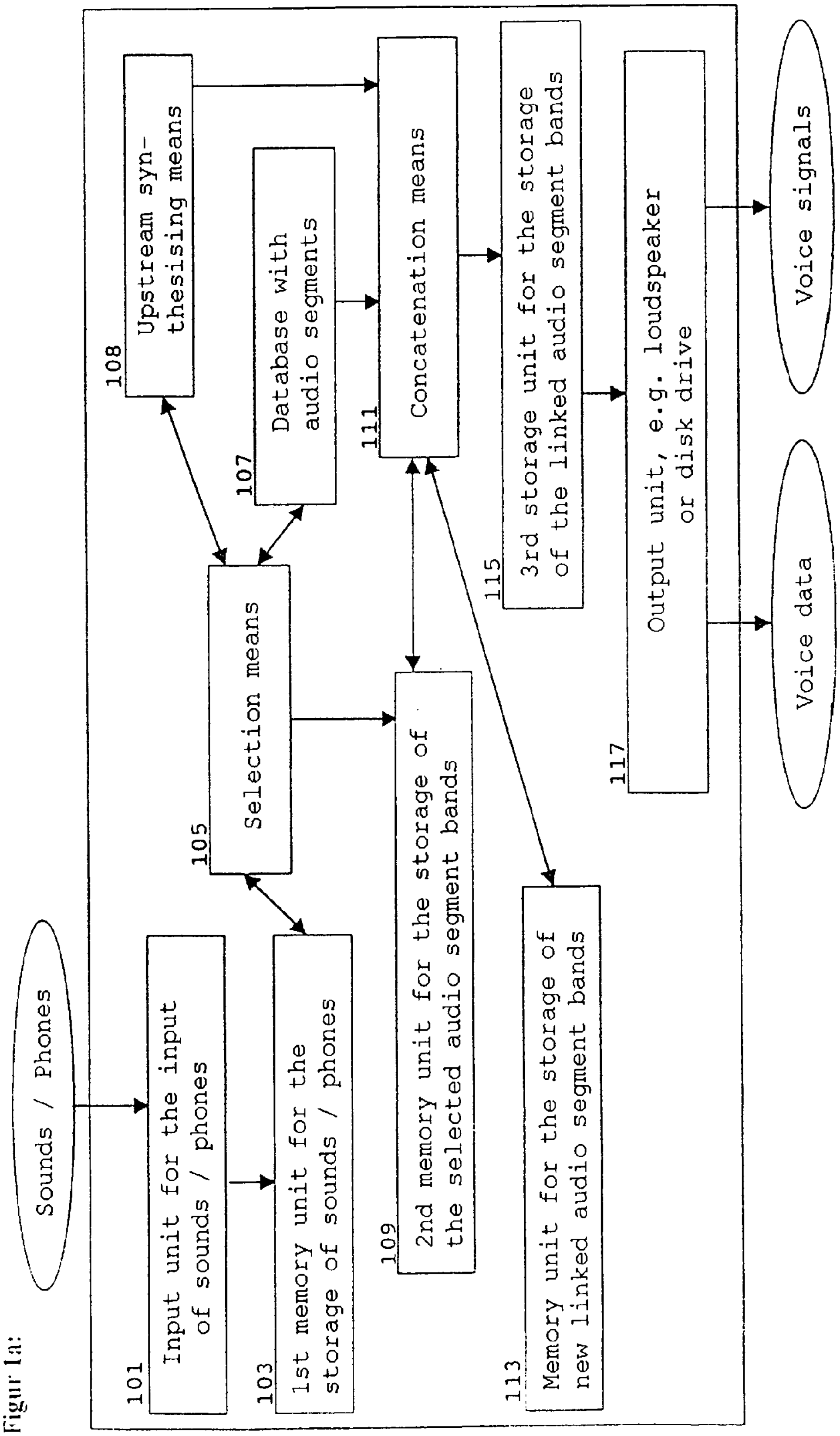

Figure 1b: Structure of a sound / phone
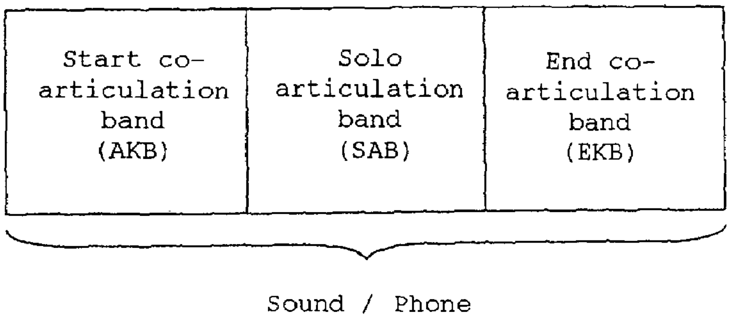

Figs. 2a to 21 Structures of the audio segments

Figs. 3a to 3d: Concatenation

Fig. 3b:
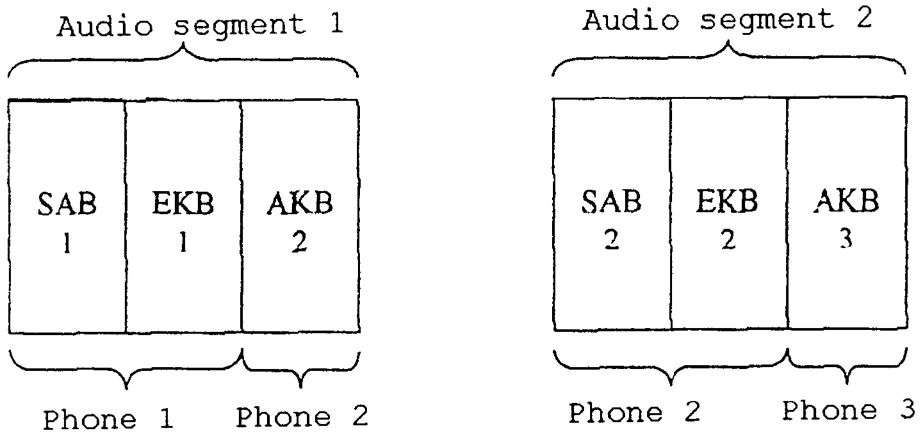
Fig. 3bI:
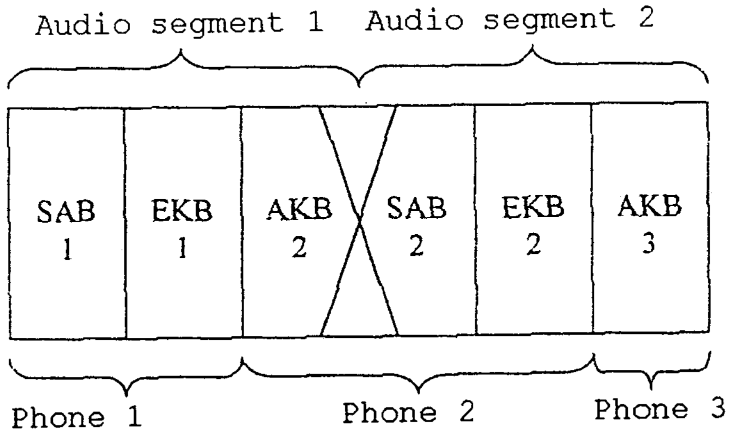
Fig. 3bII:
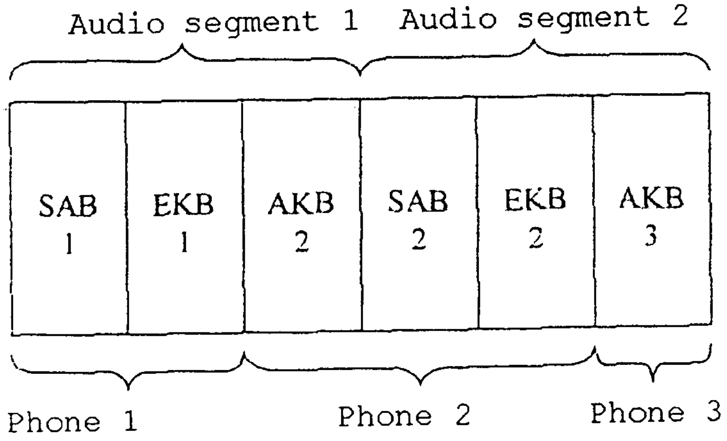

Fig. 3c:
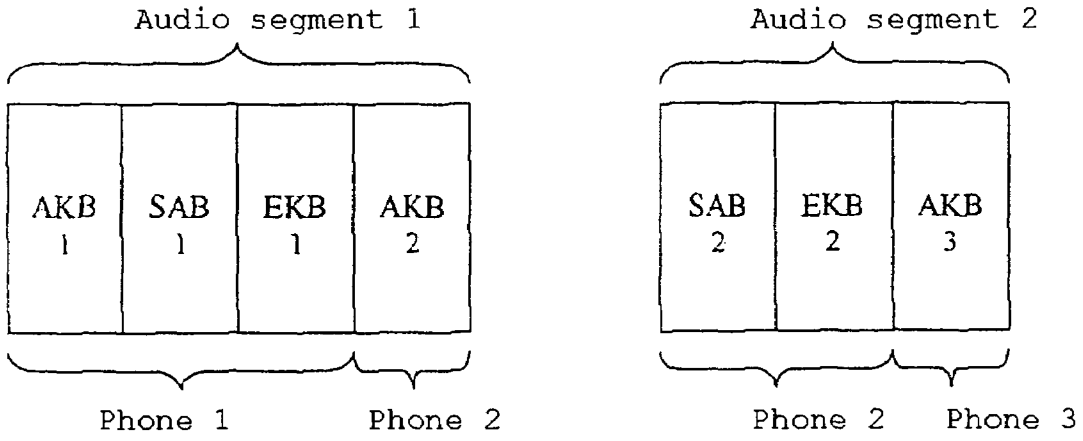
Fig. 3cI:
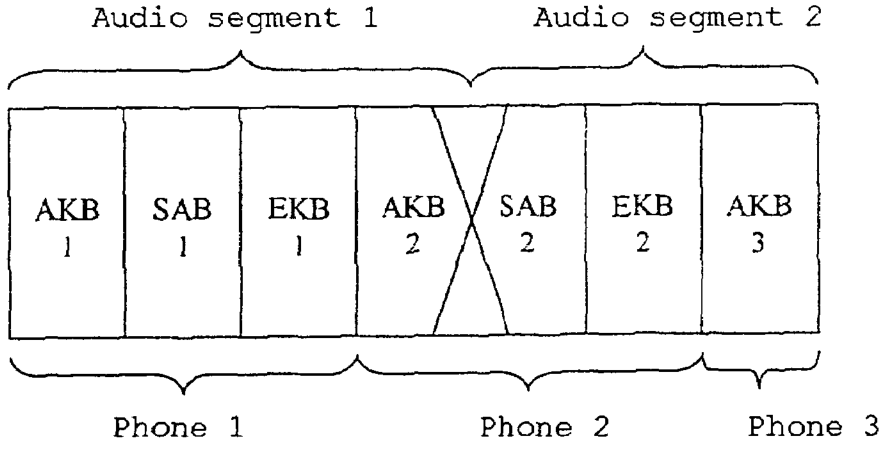
Fig. 3cII:
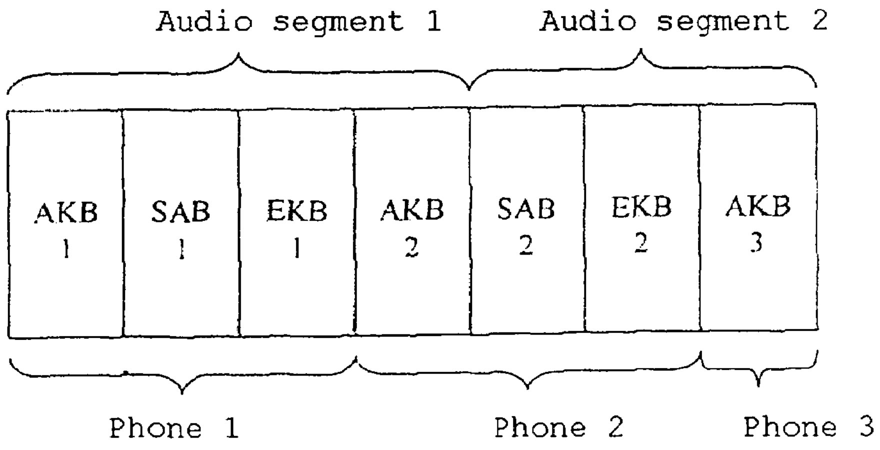

Fig. 3d:
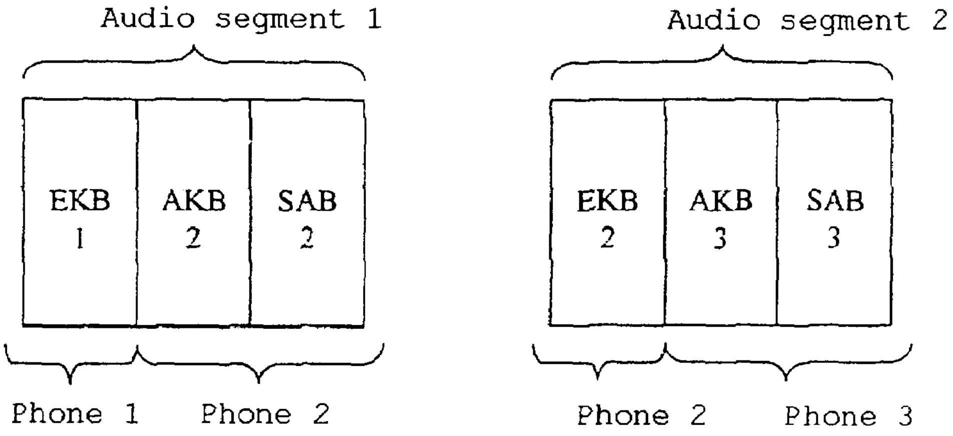
Fig. 3dI:
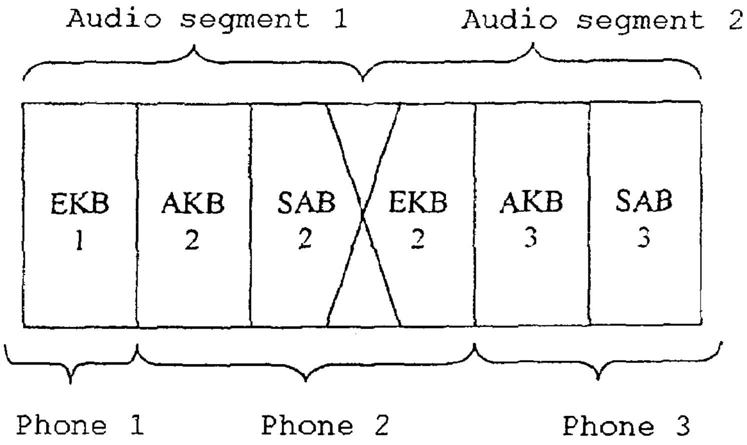
Fig. 3dII:
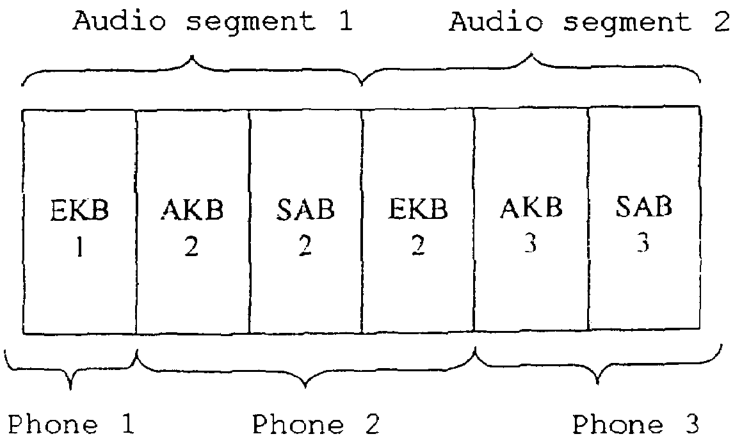

Fig. 3e:
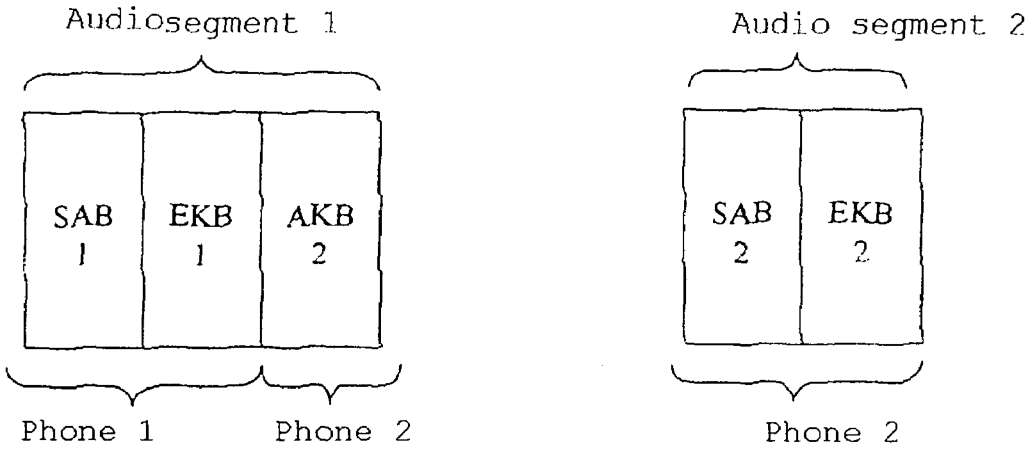
Fig. 3eI:
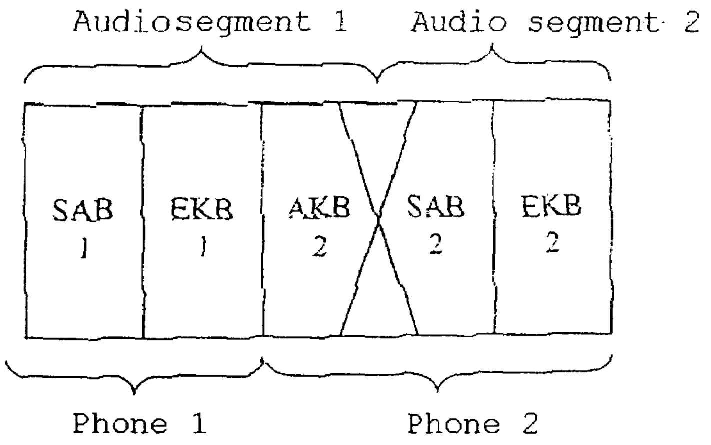
Fig. 3eII:
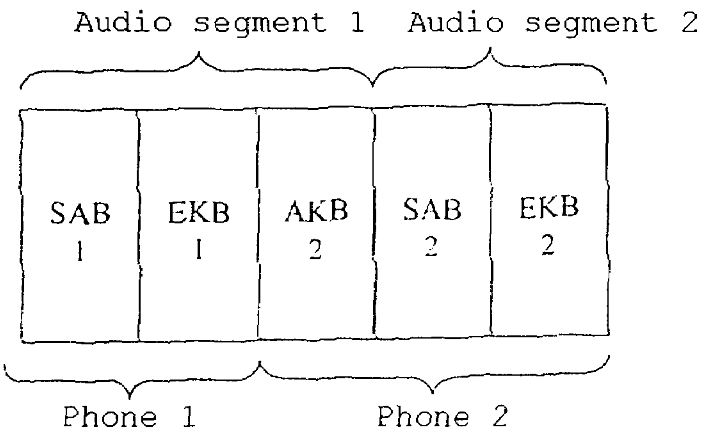

Fig. 4, Part 1
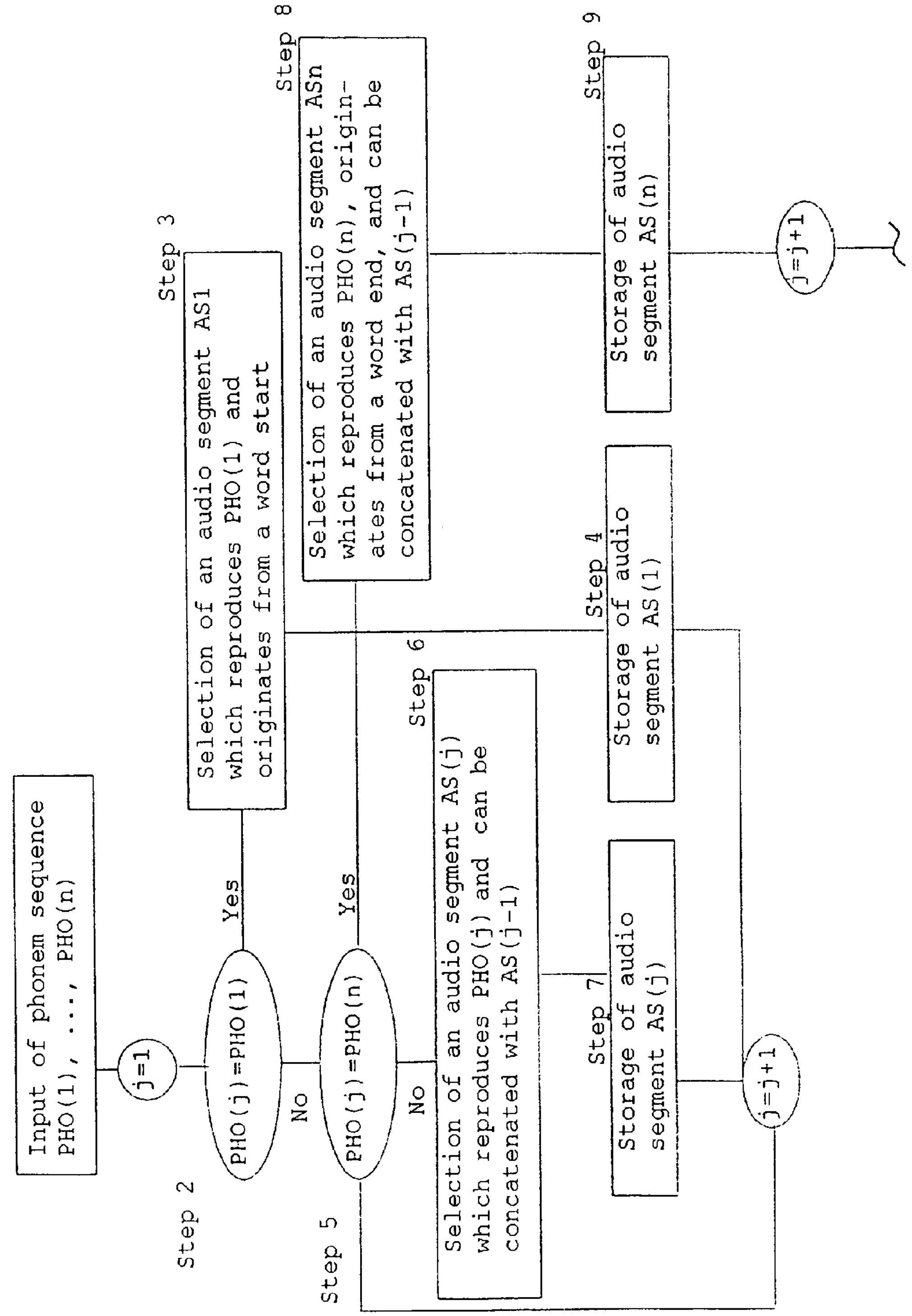

Fig. 4, Part 2
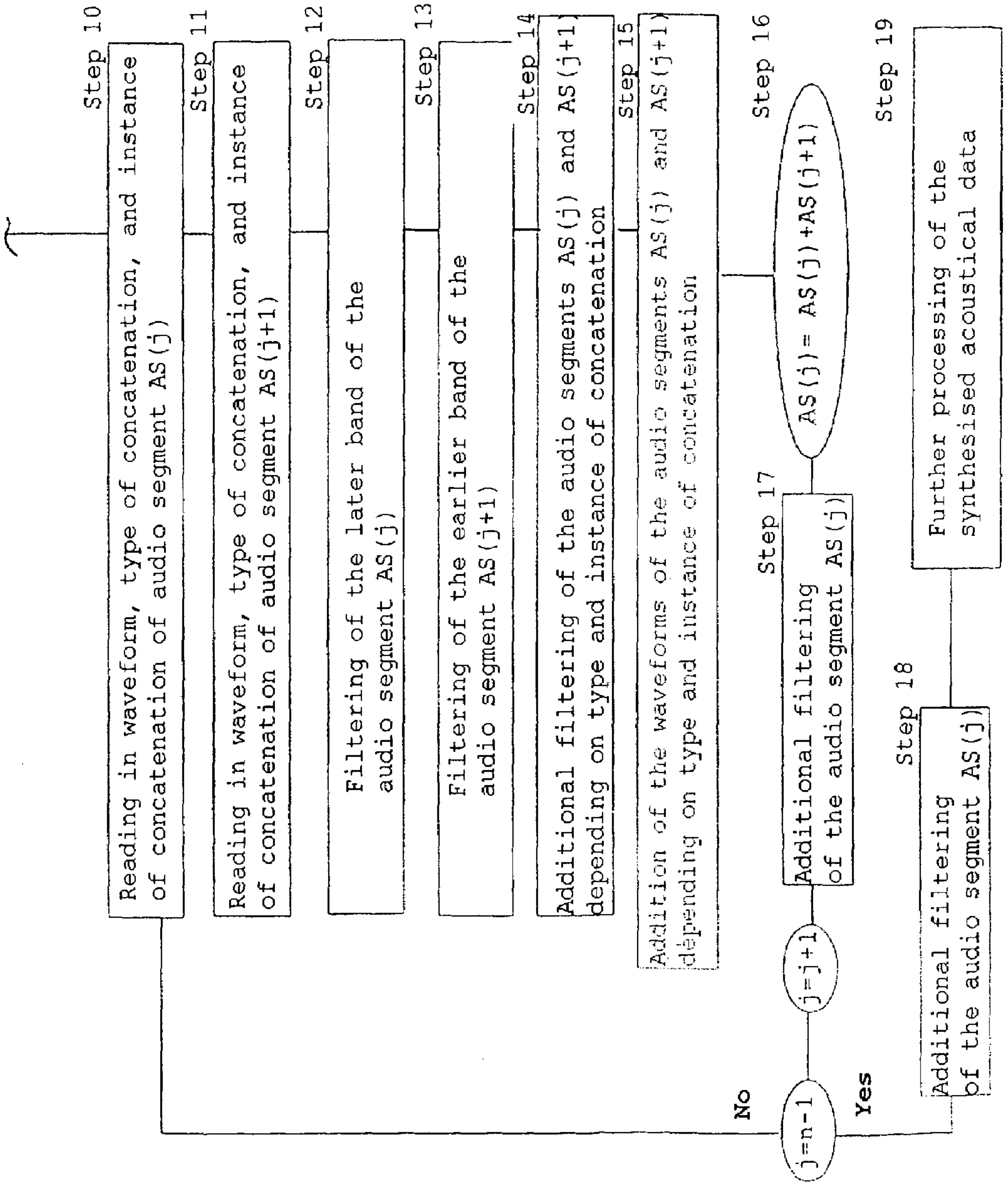

METHOD AND DEVICE FOR CO-ARTICULATED CONCATENATION OF AUDIO SEGMENTS

The invention relates to a method and a device for the concatenation of audio segments for the generation of synthesised acoustical data, in particular synthesised speech. In particular, the invention relates to synthesised voice signals which have been generated by the inventive co-articulation-specific concatenation of voice segments, as well as to a data carrier which contains a computer program for the inventive generation of synthesised acoustical data, in particular, synthesised speech.

In addition, the invention relates to a data storage which contains audio segments which are suited for the inventive co-articulation-specific concatenation, and a sound carrier which, according to the invention, contains synthesised acoustical data.

BACKGROUND

It must be emphasised that both the state of the art represented in the following, and the present invention relate to the entire field of the synthesis of acoustical data by means of the concatenation of individual audio segments which are obtained in any manner. However, for the sake of simplifying the discussion of the state of the art as well as the description of the present invention, the following explanations refer specifically to synthesised voice data by means of the concatenation of individual voice segments.

During the past years, the data-based approach has been successful over the rule-based approach in the field of speech synthesis, and can be found in various methods and systems for speech synthesis. Although the rule-based approach principally enables a better speech synthesis, it is necessary for its implementation to explicitly phrase the entire knowledge which is required for speech generation, i.e. to formally model the speech to be synthesised. Due to the fact that the known speech models comprise a simplification of the speech to be synthesised, the voice quality of the speech generated in this manner is not sufficient.

For this reason, a data-based speech synthesis is carried out to an increasing extent, wherein corresponding segments are selected from a database containing individual voice segments and linked (concatenated) to each other. In this context, the voice quality is primarily depending on the number and type of the available voice segments, because only that speech can be synthesised which is reproduced by voice segments in the data-base. In order to minimise the number of the voice segments to be provided and, nevertheless, to still generate a high quality synthesised speech, various methods are known which carry out a linking (concatenation) of the voice segments according to complex rules.

When using such methods or corresponding devices, respectively, an inventory, i.e. a database comprising the voice audio segments can be employed which is complete and manageable. An inventory is complete if it is capable of generating any sound sequence of the speech to be synthesised, and it is manageable if the number and type of the data of the inventory can be processed in a desired manner by means of the technically available means. Furthermore, such a method must ensure that the concatenation of the individual inventory elements generates a synthesised speech which differs as little as possible from a naturally spoken speech. To this end, a synthesised speech must be fluent and comprise the same articulatory effects as a natural speech. In this context, the so-called co-articulatory effects, i.e. the mutual influence of phones, are of particular importance. For this reason, the inventory elements should be of such a nature that they consider the co-articulation of individual successive phones. In addition, a method for the concatenation of the inventory elements should link the elements, even beyond word and phrase boundaries, under consideration of the co-articulation of individual successive phones as well as of the higher-order co-articulation of several successive phones.

Before presenting the state of the art, a few terms from the field of speech synthesis, which are necessary for a better understanding, will be explained in the following:

A phone is a class of any sound events (noises, sounds, tones, etc.). The sound events are classified in accordance with a classification scheme into phone classes. A sound event belongs to a phoneme if the values of the sound event are within the range of values defined for the phone with respect to the parameters (e.g. spectrum, tone level, volume, chest or head voice, co-articulation, resonance cavities, emotion, etc.) used for, the classification.

The classification scheme for phones depends on the type of application. For vocal sounds (=phones), the IPA classification is generally used. However, the definition of the term phone as used herein is not limited to this, but any other parameters can be used. If, for example, in addition to the IPA classification, the tone level or the emotional expression are included as parameters in the classification, two ‘a’ phones with different tone level or different emotional expression become different phones in the sense of the definition. Phones can, however, also be the tones of a musical instrument, e.g. a violin, in the different tone levels and the different modes of playing (up-bow and down-bow, detaché, spiccato, marcato, pizzicato, col legno, etc.). Phones can be the barking of dogs or the squealing of a car door.

Phones can be reproduced by audio segments which contain corresponding acoustical data.

In the description of the invention following the definitions, the term vocal sound can invariably be replaced by the term phone in the sense of the previous definition, and the term phoneme can be replaced by the term phonetic character. (This also applies the other way round, because phones are vocal sounds classified according to the IPA classification).

A static phone has bands which are similar to previous or subsequent bands of the static phone. The similarity need not necessarily be an exact correspondence as in the periods of a sinusoidal tone, but is analogous to the similarity as it prevails between the bands of the static phones defined in the following.

A dynamic phone has no bands with a similarity with previous or subsequent bands of the dynamic phone, such as, e.g. the sound event of an explosion or a dynamic phone.

A phone is a vocal sound which is generated by the organs of speech (a vocal sound). The phones are classified into static and dynamic phones.

The static phones include vowels, diphtongs, nasals, laterals, vibrants, and fricatives.

The dynamic phones include plosives, affricates, glottal stops, and click sounds.

A phoneme is the formal description of a phone, with the formal description usually being effected by phonetic characters.

The co-articulation refers to the phenomenon that a sound, i.e. a phone, too, is influenced by upstream or downstream sounds or phones, respectively, with the co-articulation occurring both between immediately neighbouring sounds/phones, but also covering a sequence of several sounds/phones as well (for example in rounding the lips).

A sound or phone, respectively, can therefore be classified into three bands (see also FIG. 1*b*):

The initial co-articulation band comprises the band from the start of a sound/phone to the end of the co-articulation due to a upstream sound/phone.

The solo articulation band is the band of the sound/phone which is not influenced by an upstream or downstream sound or an upstream or downstream phone, respectively.

The end co-articulation band comprises the band from the start of the co-articulation due to a downstream sound/phone to the end of the sound/phone.

The co-articulation band comprises an end co-articulation band and the neighbouring initial co-articulation band of the neighbouring sound/phone.

A polyphone is a sequence of phones.

The elements of an inventory are audio segments stored in a coded form which reproduce sounds, portions of sounds, sequences of sounds, or portions of sequences of sounds, or phones, portions of phones, polyphones, or portions of polyphones, respectively. For a better understanding of the potential structure of an audio segment/inventory element, reference is made to FIG. 2*a* which shows a conventional audio segment, and FIGS. 2*b*–2*l* which show inventive audio segments. In addition, it should be mentioned that audio segments can can be formed from smaller or larger audio segments which are included in the inventory or a database. Furthermore, audio segments can also be provided in a transformed form (e.g. in a Fourier-transformed form) in the inventory or the database. Audio segments for the present invention can also come from a prior synthesis step (which is not part of the method). Audio segments include at least a part of an initial co-articulation band, a solo articulation band, and/or an end co-articulation band. In lieu of audio segments, it is also possible to use bands of audio segments.

The term concatenation implies the joining of two audio segments.

The concatenation instance if the point of time in which two audio segments are joined.

The concatenation can be effected in various ways, e.g. with a cross fade or a hard fade (see also FIGS. 3*a*–3*e*):

In a cross fade, a downstream band of a first audio segment band and an upstream band of a second audio segment band are processed by means of suitable transfer functions, and subsequently these two bands are overlappingly added in such a manner that at the most the shorter band with respect to time of the two bands is completely overlapped by the longer one with respect to time of the two band.

In a hard fade, a later band of a first audio segment and an earlier band of a second audio segment are processed by means of suitable transfer functions, with the two audio segments being joined to one another in such a manner that the later band of the first audio segment and the earlier band of the second audio segment do not overlap.

The co-articulation band is primarily noticeable in that a concatenation therein is associated with discontinuities (e.g. spectral skips).

In addition, reference is to be made that, strictly speaking, a hard fade is a boundary case of a cross fade, in which an overlap of a later band of a first audio segment and an earlier band of a second audio segment has a length of zero. This allows to replace a cross fade with a hard fade in certain, e.g. extremely time-critical applications, with such an approach to be contemplated scrupulously, because it results in considerable quality losses in the concatenation of audio segments which actually are to be concatenated by a cross fade.

The term prosody refers to changes in the voice frequency and the voice rhythm which occur in spoken words or phrases, respectively. The consideration of such prosodic information is necessary in the speech synthesis in order to generate a natural word or phrase melody, respectively.

From WO 95/30193 a method and a device are known for the conversion of text to audible voice signals under utilising a neural network. For this purpose, the text to be converted to speech is converted to a sequence of phonema by means of a converter unit, with information on the syntactic boundaries of the text and the stress of the individual components of the text being additionally generated. This information, together with the phonema, are transferred to a device which determines the duration of the pronunciation of the individual phonema in a rule-based manner. A processor generates a suitable input for the neural network from each individual phoneme in connection with the corresponding syntactic and time-related information, with said input for the neural network also comprising the corresponding prosodic information for the entire phoneme sequence. From the available audio segments the neural network then selects only those segments which best reproduce the input phonema and links said audio segments accordingly. In this linking operation the individual audio segments with respect to their duration, total amplitude, and frequency are matched to upstream and downstream audio segments under consideration of the prosodic information of the speech to be synthesised and time successively connected with each other. A modification of individual bands of the audio segments is not described therein.

For the generation of the audio segments which are required for this method, the neural network has first to be trained by dividing naturally spoken speech into phones or phone sequences and assigning these phones or phone sequences corresponding phonema or phoneme sequences in the form of audio segments. Due to the fact that this method provides for a modification of individual audio segments only, but not for a modification of individual bands of an audio segment, the neural network must be trained with as many different phones or phone sequences as possible for converting any text to a synthesised speech with a natural sound. Depending of the application, this may prove to require very high expenditures. On the other hand, an insufficient training process of the neural network may have a negative influence on the quality of the speech to be synthesised. Moreover, it is not possible with the method described therein to determine the concatenation instance of the individual audio segments depending on upstream or downstream audio segments, in order to perform a co-articulation-specific concatenation.

U.S. Pat. No. 5,524,172 describes a device for the generation of synthesised speech, which utilises the so-called diphone method. Here, a text which is to be converted to synthesised speech is divided into phoneme sequences, with corresponding prosodic information being assigned to each phoneme sequence. From a database which contains audio segments in the form of diphones, for each phoneme of the sequence two diphones reproducing the phoneme are selected and concatenated under consideration of the corresponding prosodic information. In the concatenation the two diphones each are weighted by means of a suitable filter, and the duration and tone level of both diphones modified in such a manner that upon the linking of the diphones a synthesised phone sequence is generated, whose duration and tone level correspond to the duration and tone level of the desired phoneme sequence. In the concatenation the individual diphones are added in such a manner that a later band of a first diphone and an earlier band of a second diphone overlap, with the instance of concatenation being generally in the area of stationary bands of the individual diphones (see FIG. 2*a*). Due to the fact that a variation of the instance of concatenation under consideration of the co-articulation of successive audio segments (diphones) is not intended, the quality (naturalness and audibility) of a speech synthesised in such a manner can be negatively influenced.

A further development of the previously discussed method can be found in EP-0,813,184 A1. In this case, too, a text to be converted to synthesised speech is divided into individual phonema or phoneme sequences, and corresponding audio segments are selected from a database and concatenated. In order to achieve an improvement of the synthesised speech, two approaches have been realised with this method, which differ from the state of the art discussed so far. With the use of a smoothing filter which accounts for the lower-frequency harmonic frequency components of an upstream and a downstream audio segment, the transition from the upstream audio segment to the downstream audio segment is to be optimised, in that a later band of the upstream audio segment and an earlier band of the downstream audio segment in the frequency range are tuned to each other. In addition, the database provides audio segments which are slightly different from one another but are suited for synthesising one and the same phoneme. In this manner, the natural variation of the speech is to be mimicked in order to achieve a higher quality of the synthesised speech. Both the use of the smoothing filter and the selection from a plurality of various audio segments for the realisation of a phoneme require a high computing power of the used system components in the implementation of this method. Moreover, the volume of the database increases due to the increased number of the provided audio segments. Furthermore, this method, too, does not provide for a ca-articulation dependent choice of the concatenation instance of individual audio segments, which may reduce the quality of the synthesised speech.

DE 693 18 209 T2 deals with formant synthesis. According to this document two multi-voice phones are connected with each other using an interpolation mechanism which is applied to a last phoneme of an upstream phone and to a first phoneme of a downstream phone, with the two phonema of the two phones being identical and with the connected phones are superposed to one phoneme. Upon the superposition, each of the curves describing the two phonema is weighted with a weighting function. The weighting function is applied to a band of each phoneme, which begins immediately after the start of the phoneme and ends immediately before the end of the phoneme. Thus, in the concatenation of phones described therein, the bands of the phonema, which form the transition between phones, correspond essentially to the respective entire phonema. This means, that portions of the phonema used for concatenation, invariably comprise all three bands, i.e. the respective initial co-articulation band, solo articulation band, and end co-articulation band. Consequently, D1 teaches an approach how the transitions between two phones are to be smoothed.

Moreover, according to this document the instance of the concatenation of two phones is established in such a manner that the last phoneme in the upstream phone and the first phoneme in the downstream phone completely overlap.

Principally, it is to be stated that DE 689 15 353 T2 aims at improving the tone quality, in that an approach is specified how to design the transition between two neighbouring sampling values. This is of particular relevance in the case of low sampling rates.

In the speech synthesis described in this document, waveforms are used which reproduce the phones to be concatenated. With waveforms for upstream phones, a corresponding final sampling value and an associated zero crossing point are established, while with waveforms for downstream phones, a corresponding first upper sampling value and an associated zero crossing point are established. Depending on these established sampling values and the associated zero crossing points, phones are connected with each other by means of maximal four different ways. The number of connection types is reduced to two, if the waveforms are generated by utilising the Nyquist theoreme. DE 689 15 353 T2 describes that the used band of waveforms extends between the last sampling value of the upstream waveform and the first sampling value of the downstream waveform. A variation of the duration of the used bands as a function of the waveforms to be concatenated, as it is the case with the invention, is not disclosed in D1.

In summary, it can be said that the state of the art allows to synthesise any phoneme sequences, but that the phoneme sequences synthesised in this manner do not possess an authentic voice quality. A synthesised phoneme sequence has an authentic voice quality if it cannot be distinguished by a listener from the same phoneme sequence spoken by a real speaker.

Methods are also known which use an inventory which comprises complete words and/or phrases in authentic voice quality as inventory elements. For the speech synthesis, these elements are brought into a desired order, with the possibilities of various voice sequences being limited to a high degree by the volume of such an inventory. The synthesis of any phoneme sequences is not possible with these methods.

SUMMARY

It is therefore the object of the present invention to provide a method and a corresponding device which eliminate the problems of the state of the art and enable the generation of synthesised acoustical data, in particular, synthesised voice data, which a listener cannot distinguish from corresponding natural acoustical data, in particular, naturally spoken speech. The acoustical data synthesised by means of the invention, in particular, synthesised voice data, is to possess an authentic acoustical quality, in particular, an authentic voice quality.

For the solution of this object the invention provides a method according to claim 1, a device according to claim 14, synthesised voice signals according to claim 28, a data carrier according to claim 39, a data storage according to claim 51, as well as a sound carrier according to claim 60. The invention therefore makes it possible to generate synthesised acoustical data which reproduces a sequence of phones, in that in the concatenation of audio segments, the instance of the concatenation of two audio segments is determined, depending on properties of the audio segments to be linked, in particular the co-articulation effects which relate to the two audio segments. According to the present invention, the instance of concatenation is preferably selected in the vicinity of the boundaries of the solo articulation band. In this manner, a voice quality is achieved, which cannot be obtained with the state of the art. The required computation power is not higher than with the state of the art.

In order to mimic the variations which can be found in the corresponding natural acoustical data, in the synthesis of acoustical data, the invention provides for a different selection of the audio segment bands as well as for different ways of the co-articulation-specific concatenation. A higher degree of naturalness of the synthesised acoustical data is achieved if a later audio segment band, whose start reproduces a static phone, is connected with an earlier audio segment band by means of a cross fade, or if a later audio segment band, whose start reproduces a dynamic phone, is connected with an earlier audio segment band by means of a hard fade, respectively. In addition, it is advantageous to generate the start of the synthesised acoustical data to be generated by using an audio segment band which reproduces the start of a phone sequence, or to generate the end of the synthesised acoustical data to be generated by using an audio segment band which reproduces the end of a phone sequence, respectively.

In order to carry out the generation of the synthesised acoustical data in a simpler and faster way, the invention makes it possible to reduce the number of audio segment bands which are required for data synthesising, in that audio segment bands are used which always start with the reproduction of a dynamic phone, which allows to carry out all concatenations of these audio segment bands by means of a hard fade. For this purpose, later audio segment bands are connected with earlier audio segment bands whose starts always reproduce a dynamic phone. In this manner, high-quality synthesised acoustical data according to the invention can be generated with low computing power (e.g. in the case of answering machines or car navigation systems).

In addition, the invention provides for mimicking acoustical phenomena which result because of a mutual influence of individual segments of corresponding natural acoustical data. In particular, it is intended here to process individual audio segments or individual bands of the audio segments, respectively, with the aid of suitable functions. Thus it is possible to modify i.a. the frequency, the duration, the amplitude, or the spectrum of the audio segments. If synthesised voice data is generated by means of the invention, then preferably prosodic information and/or higher-order co-articulation effects are taken into consideration for the solution of this object.

The signal characteristic of synthesised acoustical data can additionally be improved if the concatenation instance is set in places of the individual audio segment bands to be connected, where the two used bands are in agreement with each other with respect to one or several suitable properties. These properties can be i.a.: zero point, amplitude value, gradient, derivative of any degree, spectrum, tone level, amplitude value in a frequency band, volume, style of speech, emotion of speech, or other properties covered in the phone classification scheme.

The invention further enables to improve the selection of audio segment bands for the generation of the synthesised acoustical data, as well as to make their concatenation more efficient, in that heuristic knowledge is used which relates to the selection, processing, variation, and concatenation of the audio segment bands.

In order to generate synthesised acoustical data which is voice data which does not differ from corresponding natural voice data, preferably audio segment bands are used which reproduce sounds/phones or portions of sound sequences/phone sequences.

Furthermore, the invention permits the utilisation of the generated synthesised acoustical data, in that this data is convertible to acoustical signals and/or voice signals, and/or storable in a data carrier.

In addition, the invention can be used for providing synthesised voice signals which differ from known synthesised voice signals in that, concerning their naturalness and audibility, they do not differ from real speech. For this purpose, audio segment bands are concatenated in a co-articulation-specific manner, each of which reproduces portions of the sound sequence/phone sequence of the speech to be synthesised, in that the bands of the audio segments to be used as well as the instance of the concatenation of these band are established according to the invention as defined in Claim 28.

A further improvement of the synthesised speech can be achieved if a later audio segment band whose start reproduces a static phone is connected with an earlier audio segment band by means of a cross fade, or if a later audio segment band whose start reproduces a dynamic phone, respectively, is connected with an earlier audio segment band by means of a hard fade. Herein, static phones comprise vowels, diphtongs, liquids, fricatives, vibrants, and nasals, and dynamic phones comprise plosives, affricates, glottal stops, and klick speech.

Due to the fact that the start and end stresses of phones in a natural speech differ from comparable, but embedded phones, it is to be preferred to use corresponding audio segment bands, whose starts reproduce the start of the speech to be synthesised and whose ends reproduce the end of same, respectively.

In particular in the generation of synthesised speech, a fast and efficient procedure is desirable. For this purpose, it is to be preferred to carry out the inventive co-articulation-specific concatenation invariably by means of hard fades, with only such audio segment bands being used whose starts always reproduce a dynamic sound or phone, respectively. Such audio segment bands can be generated in advance according to the invention by means of the co-articulation-specific concatenation of corresponding audio segment bands.

In addition, the invention provides voice signals which have a natural flow of speech, speech melody, and speech rhythm, in that audio segment bands are processed before and/or after the concatenation in their entirety or in individual bands by means of suitable functions. It is particularly advantageous to perform this variation additionally in areas in which the corresponding instances of concatenation are set in order to change i.a. the frequency, duration, amplitude, or spectrum.

An still further improved signal characteristic can be achieved if the concatenation instances are set in places of the audio segment bands to be linked, where these are in agreement with respect to one or several properties.

In order to permit a simple utilisation and/or further processing of the inventive voice signals by means of known methods or devices, such as a CD player, it is to be preferred in particular that the voice signals are convertible to acoustical signals or are storable in a data carrier.

For the purpose of applying the invention also to known devices such as a personal computer or a computer-controlled musical instrument, a data carrier is provided which contains a computer program which enables the performance of the inventive method or the control of the inventive device and its various embodiments, respectively. In addition, the inventive data carrier also permits the generation of voice signals which comprise co-articulation-specific concatenations.

For providing an inventory comprising audio segments, by means of which synthesised acoustical data, in particular synthesised voice data, can be generated which does not differ from corresponding natural acoustical data, the invention provides a data storage which includes audio segments which are suited for being inventively concatenated to synthesised acoustical data. Preferably, such a data carrier includes audio segments which are suited for the performance of the inventive method, for application in the inventive device, or the inventive data carrier. Alternatively, the data carrier can also include inventive voice signals.

In addition, the invention makes it possible to provide inventive synthesised acoustical data, in particular synthesised voice data, which can be utilised with conventional devices, e.g. a tape recorder, a CD player, or a PC audio card. For this purpose, a sound carrier is provided which comprises data which at least partially has been generated by the inventive method or by means of the inventive device or by using the inventive data carrier or the inventive data storage, respectively. The sound carrier may also comprise data which are the inventively co-articulation-specific concatenated voice signals.

Further properties, characteristics, advantages, or modifications of the invention will be explained with reference to the following description; in which:

BRIEF DESCRIPTION OF VIEWS IN THE DRAWING

FIG. 1*a* is a schematic representation of an inventive device for the generation of synthesised acoustical data;

FIG. 1*b* shows the structure of a sound/phone;

FIG. 2*a* shows the structure of a conventional audio segment according to the state of the art, consisting of portions of two phones, i.e. a diphone for voice. It is essential that the solo articulation bands each are included only partially in the conventional diphone audio segment.

Figure 2B:
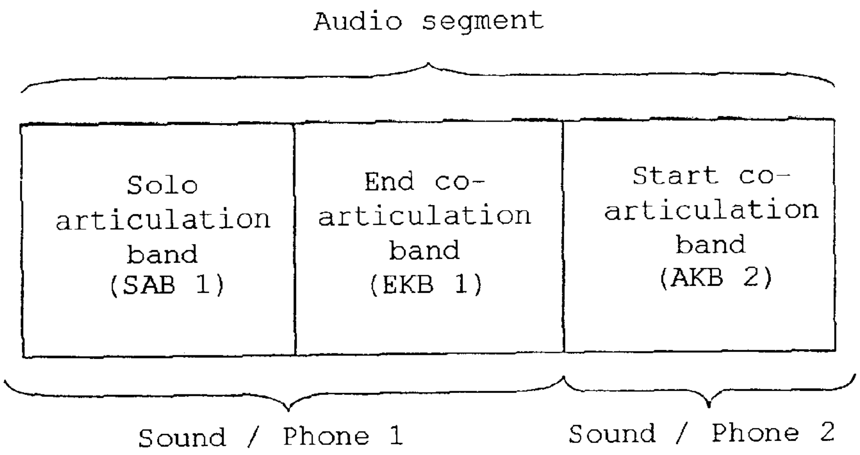
Figure 2C:
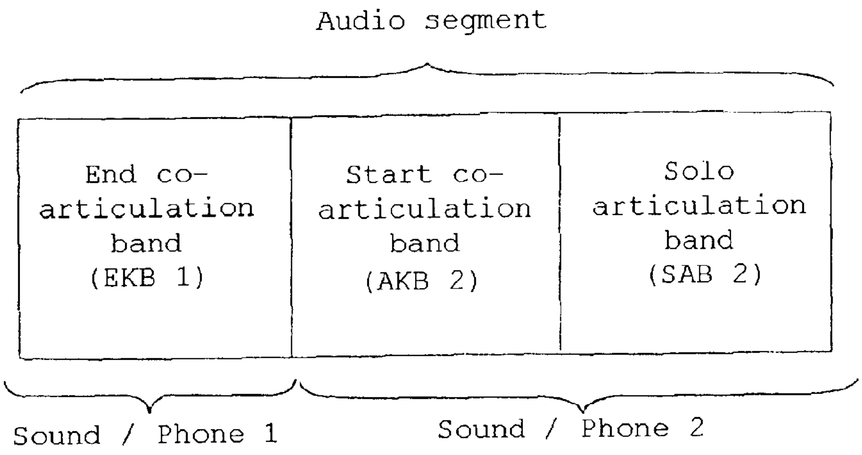
Figure 2D:
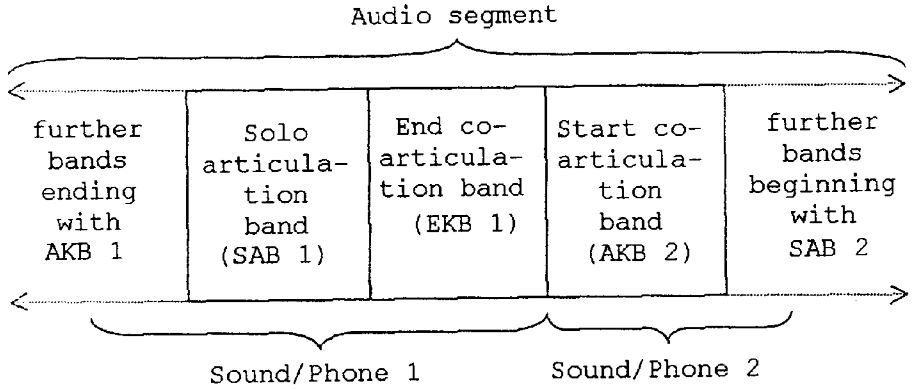
Figure 2E:
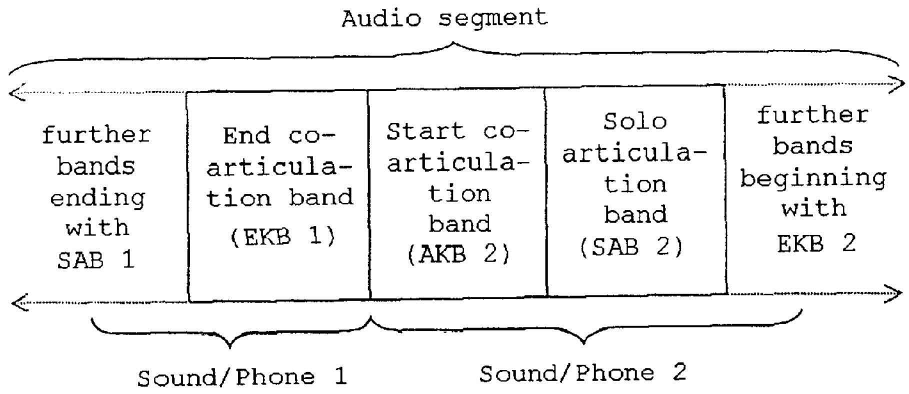
Figure 2F:
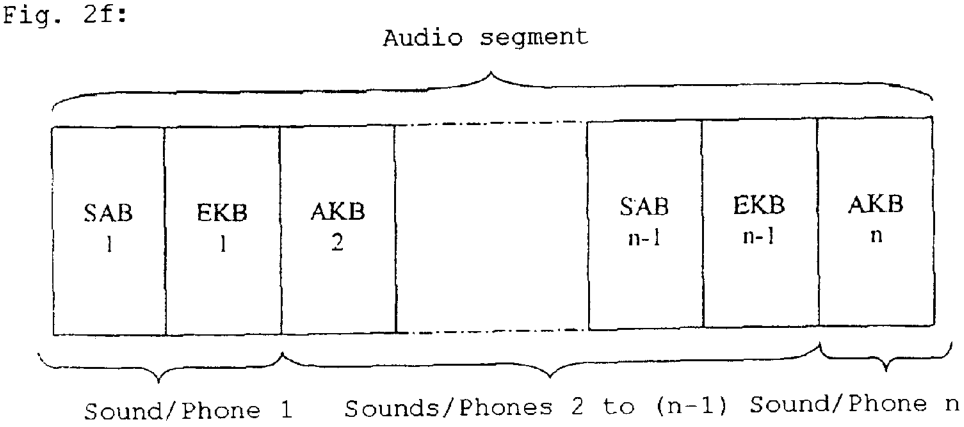

FIG. 2*b* shows the structure of an inventive audio segment which reproduces portions of a sound/phone with downstream co-articulation bands (for voice a quasi 'displaced' diphone);

FIG. 2*c* shows the structure of an inventive audio segment which reproduces portions of a sound/phone with upstream co-articulation bands;

FIG. 2*d* shows the structure of an inventive audio segment which reproduces portions of a sound/phone with downstream co-articulation bands and includes additional bands;

FIG. 2*e* shows the structure of an inventive audio segment which reproduces portions of a sound/phone with upstream co-articulation bands and includes additional bands;

FIG. 2*f* shows the structure of an inventive audio segment which reproduces portions of several sounds/phones (for speech: a polyphone) with downstream co-articulation bands each. The sounds/phones 2 to (n−1) each are completely included in the audio segment.

Figure 2G:
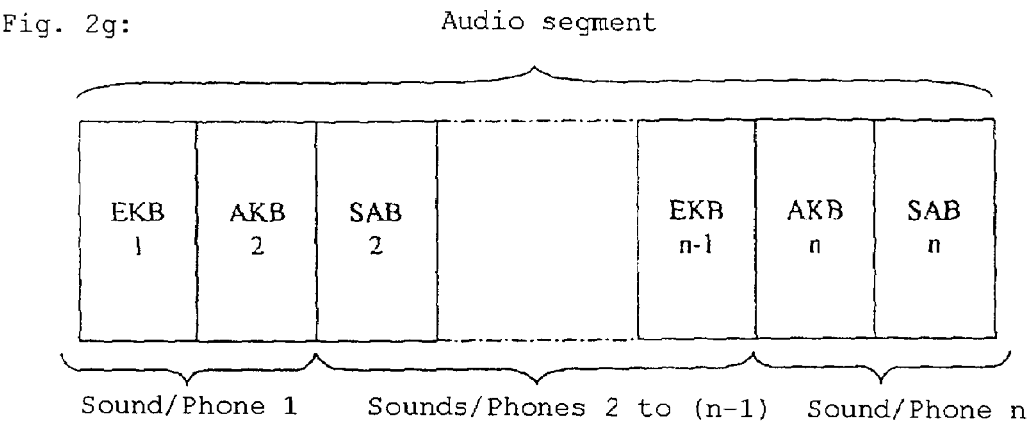

FIG. 2*g* shows the structure of an inventive audio segment which reproduces portions of several sounds/phones (for speech: a polyphone) with upstream co-articulation bands each. The sounds/phones 2 to (n−1) each are completely included in the audio segment.

Figure 2H:
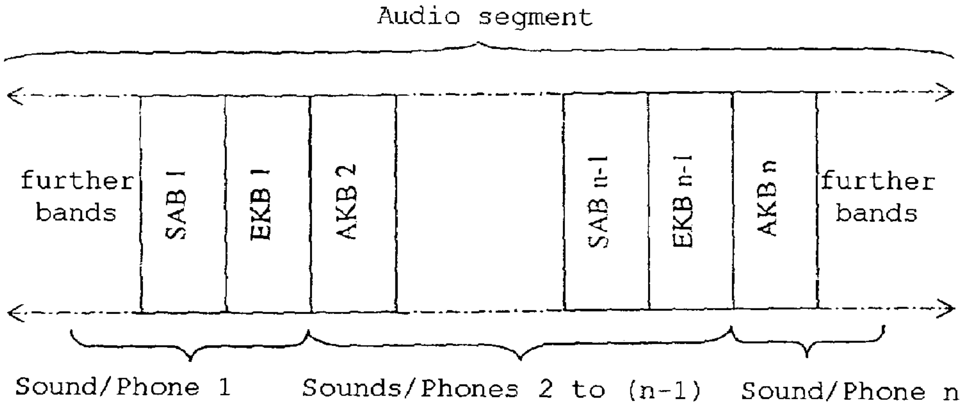

FIG. 2*h* shows the structure of an inventive audio segment which reproduces portions of several sounds/phones (for speech: a polyphone) with downstream co-articulation bands each and includes additional bands. The sounds/phones 2 to (n−1) each are completely included in the audio segment.

Figure 2I:
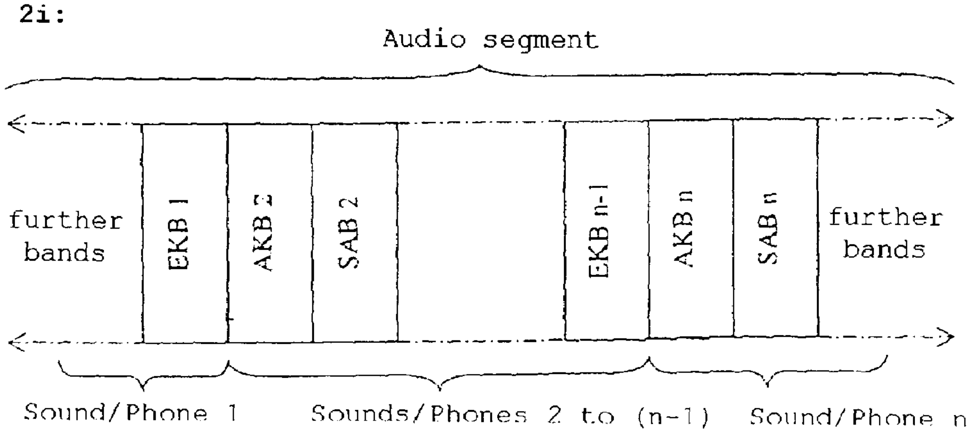

FIG. 2*i* shows the structure of an inventive audio segment which reproduces portions of several sounds/phones (for speech: a polyphone) with downstream co-articulation bands each and includes additional bands. The sounds/phones 2 to (n−1) each are completely included in the audio segment.

Figure 2J:
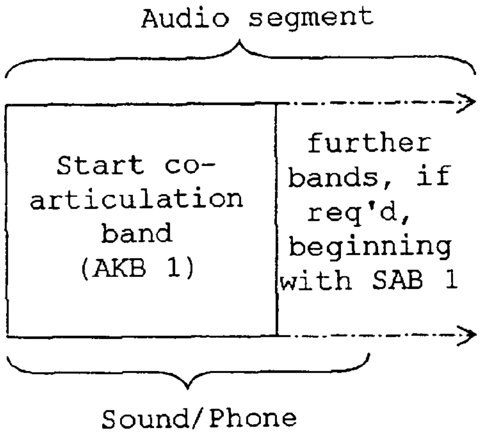
Figure 2K:
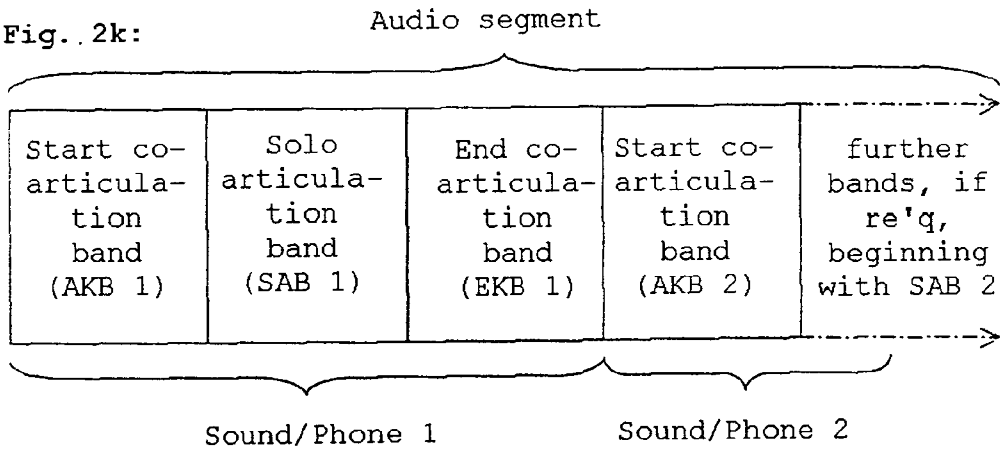
Figure 2L:
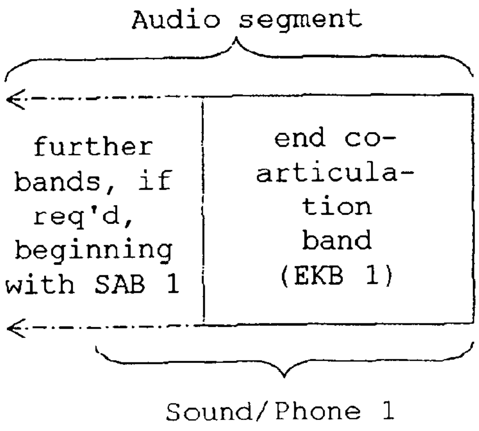
Figure 3A:
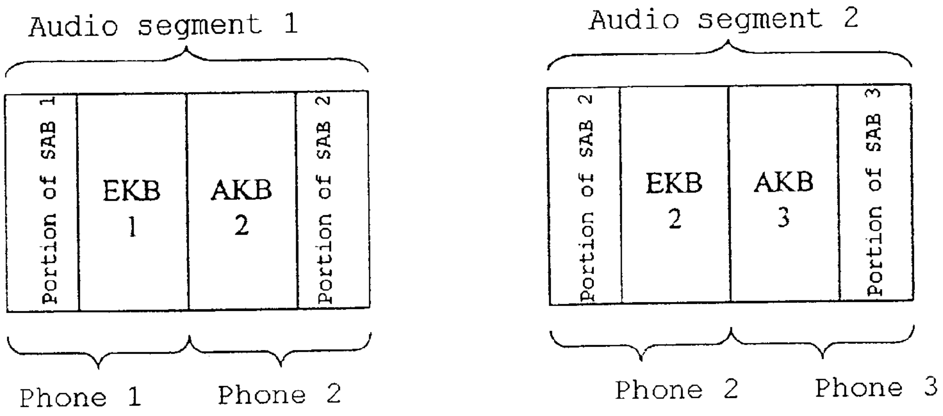
Figure 3A:
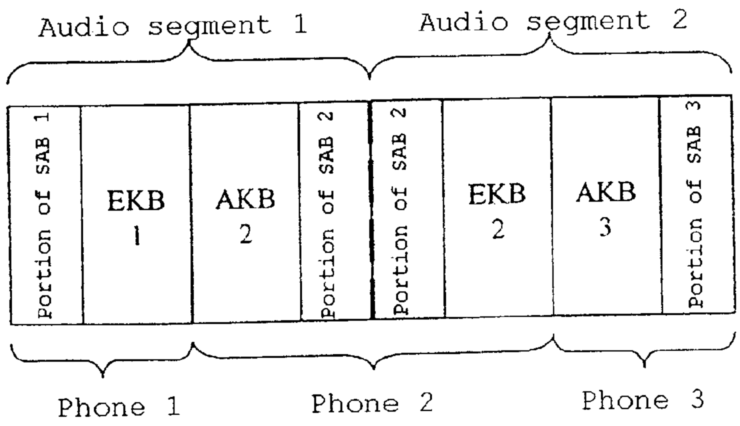

FIG. 2*j* shows the structure of an inventive audio segment which reproduces a portion of a sound/phone of the start of a sound sequence/phone sequence;

FIG. 2*k* shows the structure of an inventive audio segment which reproduces portions of sounds/phones of the start of a sound sequence/phone sequence;

FIG. 2*l* shows the structure of an inventive audio segment which reproduces a sound/phone of the end of a sound sequence/phone sequence;

FIG. 3*a* shows the concatenation according to the state of the art by means of an example of two conventional audio segments. The segments begin and end with portions of the solo articulation bands (generally half of same).

FIG. 3*a*I shows the concatenation according to the state of the art. The solo articulation band of the middle phone comes from two different audio segments.

FIG. 3*b* shows the concatenation according to the inventive method by means of an example of two audio segments, each of which containing a sound/phone with downstream co-articulation bands. Both sounds/phones come from the centre of a phone unit sequence.

FIG. 3*b*I shows the concatenation of these audio segments by means of a cross fade. The solo articulation band comes from an audio segment. The transition between the audio segments is effected between two bands and is therefore less susceptible to variations (in spectrum, frequency, amplitude, etc.). The audio segments can also be processed by means of additional transfer functions prior to the concatenation.

FIG. 3*b*II shows the concatenation of these audio segments by means of a hard fade;

FIG. 3*c* shows the concatenation according to the inventive method by means of an example of two inventive audio segments, each of which containing a sound/phone with downstream co-articulation bands, with the first audio segment coming from the start of a phone sequence.

FIG. 3*c*I shows the concatenation of these audio segments by means of a cross fade;

FIG. 3*c*II shows the concatenation of these audio segments by means of a hard fade;

FIG. 3*d* shows the concatenation according to the inventive method by means of an example of two inventive audio segments, each of which containing a sound/phone with upstream co-articulation bands. Both audio segments come from the centre of a phone sequence.

FIG. 3*d*I shows the concatenation of these audio segments by means of a cross fade. The solo articulation band comes from an audio segment.

FIG. 3*d*II shows the concatenation of these audio segments by means of a hard fade;

FIG. 3*e* shows the concatenation according to the inventive method by means of an example of two inventive audio segments, each of which containing a sound/phone with downstream co-articulation bands, with the last audio segment coming from the end of a phone sequence;

FIG. 3*e*I shows the concatenation of these audio segments by means of a cross fade;

FIG. 3*e*II shows the concatenation of these audio segments by means of a hard fade;

FIG. 4 is a schematic representation of the steps of the inventive method for the generation of synthesised acoustical data.

DETAILED DESCRIPTION

The reference numerals used in the following refer to FIG. 1*a* and the numbers of the various steps of the method used in the following refer to FIG. 4.

In order to convert for example a text to synthesised speech by means of the invention, it is necessary to divide this text in a preparatory step into a sequence of phonetic characters or phonema, respectively. Preferably, prosodic information corresponding to the text is to be generated as well. The sound or phone sequence, respectively, as well as the prosodic and additional information serve as input values for the inventive method or the inventive device, respectively.

The sounds/phones to be synthesised are supplied to an input unit 101 of the device 1 for the generation of synthesised voice data and stored in a first memory unit 103 (see FIG. 1*a*). By means of a selection means 105 audio segments are selected from an inventory including audio segments (elements) which is stored in a database 107, or by an upstream synthesis means 108 (which is not part of the invention), which reproduce sounds or phones, respectively, or portions of sounds or phones, respectively, which correspond to the individually input phonetic characters or phonema, respectively, or portions of same and stored in a second memory unit 109 in an order corresponding to the order to the input phonetic characters or phonema, respectively. If the inventory includes portions of phone sequences or of audio segments, the selection unit 105 preferably selects those audio segments which reproduce the highest number of portions of the phone sequences or polyphones, respectively, which correspond to a sequence of phonetic characters or phonema, respectively, from the input phone sequence or phoneme sequence, respectively, so that a minimum number of audio segments is required for the synthesis of the input phoneme sequence.

If the database 107 or the upstream synthesis means 108 provides an inventory with audio segments of different types, the selection means 105 preferably selects the longest audio segment bands which reproduce portions of the sound sequence/phone sequence in order to synthesise the input sound sequence or phone sequence, respectively, and/or a sequence of sounds/phones from a minimum number of audio segment bands. In this context, it is advantageous to use audio segment bands reproducing linked sounds/phones, which reproduce an earlier static sound/phone and a later dynamic sound phone. In this manner, audio segments are generated which, because of the embedded dynamic sounds/phones invariably begin with a static sound/phone. For this reason, the concatenation procedure for such audio segments is simplified and standardised, because only cross fades are required for this.

In order to achieve a co-articulation-specific concatenation of the audio segment bands to be linked, the concatenation instances of two successive audio segment bands are established with the aid of a concatenation means 111 as follows:

If an audio segment band is to be used for synthesising the start of the input sound sequence/phone sequence (step 1), an audio segment band is to be selected from the inventory, which reproduces the start of a sound sequence/phone sequence and to be linked with a later audio segment band (see FIG. 3*c* and step 3 in FIG. 4).

In the concatenation of a second audio segment band with an earlier first audio segment band, a distinction must be made as to whether the second audio segment band starts with the reproduction of a static sound/phone or a dynamic sound/phone in order to appropriately make the selection of the instance of concatenation (step 6).

If the second audio segment band starts with a static sound/phone, then the concatenation is carried out in the form of a cross fade, with the instance of concatenation being set in the downstream portion of the first audio segment band and in the upstream portion of the second audio segment band, with the two bands overlapping in the concatenation or at least bordering on one another (see FIGS. 3*b*I, 3*c*I, 3*d*I, and 3*e*I; concatenation by means of cross fade).

If the second audio segment band starts with a dynamic sound/phone, then the concatenation is carried out in the form of a hard fade, with the instance of concatenation being set immediately after of the downstream portion of the first audio segment band and immediately before the upstream band of the second audio segment band (see FIGS. 3*b*II, 3*c*II, 3*d*II, and 3*e*II; concatenation by means of hard fade).

In this manner, new audio segments can be generated from the originally available audio segment bands, which start with the reproduction of a static sound/phone. This is achieved in that audio segment bands which start with the reproduction of a dynamic sound/phone are linked later with audio segment bands which start with the reproduction of a static sound/phone. Though this increases the number of audio segments or the volume of the inventory, respectively, can, however, be a computational advantage, because fewer individual concatenations are required for the generation of a phone sequence/phoneme sequence, and concatenations have to carried out only in the form of cross fades. Preferably, the new linked audio segments are supplied to the database 107 or another memory unit 113.

A further advantage of this linking of the original audio segment bands to new longer audio segments results if, for example, a sequence of sounds/phones frequently repeats itself in the input sound sequence/phone sequence. It is then possible to utilise one of the new correspondingly linked audio segments, and it is not necessary to carry out another concatenation of the originally available audio segment bands with each occurrence of this sequence of sounds/phones. Preferably, overlapping co-articulation effects, too, are to be covered, or specific co-articulation effects in the form of additional data is to be assigned to the stored linked audio segment, respectively, when storing such linked audio segments.

If an audio segment band is to be used for synthesising the end of the input sound sequence/phone sequence, an audio segment band is to be selected from the inventory, which reproduces an end of a sound sequence/phone sequence, and to be linked with an earlier audio segment band (see FIG. 3*e* and step 8 in FIG. 4).

The individual audio segments are stored in a coded form in the database 107, with the coded form of the audio segments, apart from the waveform of the respective audio segment, being able to indicate which type of concatenation (e.g. hard fade, linear or exponential cross fade) is to be carried out with which later audio segment band, and at which instance the concatenation takes place with which later audio segment band. Preferably, the coded form of the audio segments also includes information with respect to the prosody, higher-order co-articulations and transfer functions which are used to achieve an additional improvement of the voice quality.

In the selection of the audio segment bands for synthesising the input sound sequence/phone sequence, the audio segment bands selected as the later ones are such that they correspond to the properties of the respective earlier audio segment bands, i.a. type of concatenation and concatenation instance. After the selection of the audio segment bands, each of which reproducing portions of the sound sequence/phone sequence, from the database 107 or the upstream synthesising means 108, the concatenation of two successive audio segment bands by means of the concatenation means 111 is carried out as follows. The waveform, the type of concatenation, the concatenation instance as well as any additional information, if required, of the first audio segment band and the second audio segment band are loaded from the database of the synthesising means (FIG. 3*b* and steps 10 and 11). Preferably such audio segment bands are selected in the above mentioned selection of the audio segment bands, which are in agreement with each other with respect to their type and instance of concatenation. In this case, loading of information with respect to type and instance of concatenation of the second audio segment band is no longer necessary.

For the concatenation of the two audio segment bands, the waveform of the first audio segment band in a later band and the waveform of the second audio segment band in an earlier band, each are processed by means of suitable transfer functions, e.g. multiplied by a suitable weighting function (see FIG. 3*b*, steps 12 and 13). The lengths of the later band of the first audio segment and of the earlier band of the second audio segment result from the type of concatenation and the time position of the concatenation instance, with these lengths also being able to be stored in the coded form of the audio segments in the database.

If the two audio segment bands are to be linked by means of a cross fade, they are added in an overlapping manner according to the respective instance of concatenation (see FIGS. 3*b*I, 3*c*I, 3*d*I, and 3*e*I; step 15). Preferably, a linear symmetrical cross fade is to be used herein, however, any other type of cross fade or any type of transfer function can be employed as well. If a concatenation in the form of a hard fade is to be carried out, the two audio segment bands are not joined consecutively in an overlapping manner (see FIGS. 3*b*II, 3*c*II, 3*d*II, and 3*e*II; step 15). As can be seen in FIG. 3*b*II, the two audio segment bands are arranged immediately successive in time. In order to be able to further process the voice generated in this manner, it is preferably stored in a third memory unit 115.

For the further linking with successive audio segment bands, the audio segments bands linked so far are considered as a first audio segment band (step 16), and the above described linking process is repeated until the entire sound sequence/phone sequence has been synthesised.

For an improvement of the quality of the synthesised voice data, the prosodic and additional information which are input in addition to the sound sequence/phone sequence, are preferably to be considered in the linking of the audio segment bands. By means of known methods, the frequency, duration, amplitude, and/or spectral properties of the audio segment bands can be modified before and/or after the concatenation in such a manner that the synthesised voice data comprises a natural word and/or phrase melody (steps 14, 17, or 18). In this context it is to be preferred to select concatenation instances at places of the audio segment bands, at which they agree in one or several suitable properties.

In order to optimise the transitions between two successive audio segment bands, the processing of the two audio segment bands by means of suitable functions in the area of the concatenation instance is additionally provided, in order to i.a. tune the frequencies, durations, amplitudes, and spectral properties. The invention additionally permits to take into consideration higher-order acoustical phenomena of a real speech, such as for example higher-order co-articulation effects of style of speech (i.a. whispering, stress, singing voice, falsetto, emotional expression) in the synthesising of the sound sequence/phone sequence. For this purpose, information relating to such higher-order phenomena, is additionally stored in a coded form with the corresponding audio segment bands in order to select only such audio segment bands in the selection which correspond to the higher-order co-articulation properties of the earlier and/or later audio segment bands.

The synthesised voice data generated in this manner preferably have a form which, with the aid of an output means 117, allows to convert the voice data to acoustical voice signals and to store the voice data and/or voice signals in an acoustical, optical, magnetic, or electrical data carrier (step 19).

Generally, inventory elements are generated via the recording of actually spoken speech. Depending on the level of training of the inventory-building speaker, i.e. his or her capability for controlling the speech to be recorded (e.g. to control the tone level of the speech or to speak exactly on one tone level), it is possible to generate identical or similar inventory elements which have displaced boundaries between the solo articulation bands and the co-articulation bands. This results in considerably more possibilities of setting the concatenation points in different places. As a consequence, the quality of a speech to be synthesised can be considerably enhanced.

This invention allows for the first time to generate synthesised voice signals by means of a co-articulation-specific concatenation of individual audio segment bands, because the instance of concatenation is selected depending on the respective audio segment bands to be linked. In this manner, a synthesised speech can be generated which is no longer distinguishable from a naturally spoken speech. Contrary to known methods or devices, the audio segments used herein are not generated by speaking or recording, respectively, complete words, in order to ensure an authentic voice quality. It is therefore possible by means of this invention to generate synthesised speech of any contents with the quality of an actually spoken speech.

Although this invention is described by way of the example of the speech synthesis, it is not limited to the field of synthesised speech, but can be used for synthesising any acoustical data or any sound events, respectively. This invention can therefore be employed for the generation and/or provision of synthesised voice data and/or voice signals for any language or dialect, as well as for the synthesis of music.

The invention claimed is:

1. A method for generating synthesized acoustical data by concatenating audio segments of sounds to reproduce a sequence of concatenated sounds/phones wherein each sound/phone comprises three bands including an initial co-articulation band, a solo articulation band and a final co-articulation band, and each segment comprises one or more bands of a sound/phone, said method comprising:

generating an inventory of audio segments comprising a plurality of audio segments comprising bands of one or more sounds/phones;

establishing an earlier audio segment with at least a portion of one band of a sound/phone selected for including an instance of concatenation;

establishing a later audio segment with the rest of the portions of the bands of the selected sound/phone wherein at least one of the earlier or later audio segments comprises bands of at least two adjacent sound/phones, and wherein the solo articulation band of the selected sound/phone is at the trailing end of the earlier segment or at the leading end of the later segment and at least part of one of the co-articulation bands of the selected sound/phone is adjacent to the solo articulation band; and concatenating the two audio segments, whereby the concatenated audio segments comprise at least three bands of two adjacent sounds/phones.

2. The method of claim 1 wherein the solo articulation band of the selected sound/phone is at the leading edge of the later audio segment and the final co-articulation band of the selected sound/phone is adjacent to the solo articulation band.

3. The method of claim 1 wherein the solo articulation band of the selected sound/phone is at the trailing edge of the earlier audio segment and the final co-articulation band of the selected sound/phone is at the leading edge of the later audio segment.

4. The method of claim 1 wherein at least a portion of one of the co-articulation bands of the selected sound/phone is disposed at an end of one of the segments and is opposite the solo articulation band at the end of the other segment.

5. The method of claim 1 wherein the leading band of the later audio segment reproduces a static sound and the two audio segments are concatenated by overlapping the opposite, adjacent solo and co-articulation bands of the selected sound/phone with each other where the transfer function and the length of overlap are determined by acoustical data in the two segments.

6. The method according to claim 5 wherein the static phones include vowels, diphthongs, liquids, vibrants, fricatives and nasals.

7. The method of claim 1 wherein the band in the leading edge of the later audio segment reproduces a dynamic sound and the two audio segments are concatenated in a non-overlapping manner each other with the transfer function determined by acoustical data in the two segments.

8. The method according to claim 7 wherein the dynamic phones include plosives, affricates, glottal stops, and click sounds.

9. The method according to claim 1 wherein the initial co-articulation band of the selected sound/phone is disposed in the earlier audio segment and reproduces the properties of the start of the selected sound/phone sequence.

10. The method according to claim 1 wherein the final co-articulation band of the selected sound/phone is disposed in the later audio segment and reproduces the properties of the end of the selected sound/phone sequence.

11. The method according to claim 1 wherein voice data to be synthesized is combined in groups and each group comprises one or more individual audio segments.

12. The method according to claim 1 wherein an audio segment is established for the later audio segment band comprises the highest number of successive portions of the sounds/phones of the sound/phone sequence in order to use the smallest number of audio segment bands in the generation of the synthesized acoustical data.

13. The method according to claim 1 wherein the bands of the individual audio segments are processed in accordance with properties of the concatenated sound/phone sequence and wherein said properties include one or more of the group consisting of a modification of frequency, duration, amplitude, and spectrum.

14. The method according to claim 1 wherein the bands of individual audio segments are processed in accordance with properties of the selected band wherein the instance of concatenation lies, with these properties including one or more of the group of properties consisting of frequency, duration, amplitude, and spectrum.

15. The method according to claim 1 wherein the instance of concatenation is set in the bands of the selected sound/phone where at least two bands are in agreement with respect to one or more properties of the group of properties consisting of zero point, amplitude, gradients, derivatives of any degree, spectra, tone levels, amplitude values within a frequency band, volume, style of speech, and emotion of speech.

16. The method according to claim 1 wherein the acoustical data to be synthesized comprises voice data, and the sounds are phones.

17. The method according to claim 1 wherein the synthesized acoustical data is converted to acoustical signals and/or voice signals.

18. The method of claim 1 wherein the instance of concatenation is disposed within or at an end of one of the co-articulation bands.

19. A device for generating synthesized acoustical data by concatenating audio segments of sounds to reproduce a sequence of concatenated sounds/phones from sounds/phones that include an initial co-articulation band, a solo articulation band and a final co-articulation band, comprising:

segment providing means (107/108) for providing audio segments, said segments comprising bands of one or more sounds/phones;

establishing means (105) for establishing at least two audio segments from the segment providing means, said establishing means selecting an earlier audio segment having at least a portion of a band of one band of the selected sound/phone and a later audio segment with the rest of the portions of the bands of the selected sound/phone, wherein at least one of the earlier or later audio segments comprises bands of at least two adjacent sounds/phones, and said earlier audio segment having a solo articulation band of the selected sound/phone at the trailing end of the earlier segment or at the leading end of the later segment, at least part of one of the co-articulation bands of the selected sound/phone is adjacent to the solo articulation band and said selected sound/phone having an instance of concatenation means for determining the duration and position of bands in the audio segments depending on the earlier and later audio segments; and means for concatenating (111) the two audio segments at an instance of concatenation within the selected sound/phone and as a function of properties of the bands at the trailing end of the earlier segment and at the leading end of the later segment, whereby the concatenated audio segments comprise at least three bands of two adjacent sounds/phones.

20. The device of claim 19 wherein the means for providing audio segments comprises a database (107) for storing in which audio segments are stored, each of which reproducing portion of a phone or portions of a sequence of (concatenated) phones or a synthesis means (108) for supplying audio segments or any combination of said database and said synthesis means.

21. The device of claim 19 wherein the solo articulation band of the selected sound/phone is at the leading edge of the later audio segment and the final co-articulation band of the selected sound/phone is adjacent to the solo articulation band.

22. The device of claim 19 wherein the solo articulation band of the selected sound/phone is at the trailing edge of the earlier audio segment and the final co-articulation band of the selected sound/phone is at the leading edge of the later audio segment.

23. The device of claim 19 wherein at least a portion of one of the co-articulation bands of the selected sound/phone is disposed at an end of one of the segments and is opposite the solo articulation band at the end of the other segment.

24. The device of claim 19 wherein said concatenating means overlaps the leading band of the later audio segment having a static sound with the trailing band of the earlier audio segment and the transfer function and the length of overlap are determined by acoustical data in the two segments.

25. The device of claim 24 wherein the static phones include vowels, diphthongs, liquids, vibrants, fricatives and nasals.

26. The device of claim 19 wherein said concatenating means concatenates the audio segments in a non-overlapped manner when the band in the leading edge of the later audio segment reproduces a dynamic sound with the transfer function determined by acoustical data in the two segments.

27. The device according to claim 26 wherein the dynamic phones include plosives, affricates, glottal stops, and click sounds.

28. The device according to claim 19 wherein the selection means (105) selects audio segments which reproduce the greatest number of successive portions of concatenated phones of the concatenated phone sequence.

29. The device according to claim 19 wherein the concatenation means (111) comprises means for processing the bands of individual audio segments depending on properties of the concatenated phone sequence and with one or more functions selected from the group consisting of modification of frequency, duration, amplitude, and spectrum.

30. The device according to claim 19 wherein the concatenation means (111) comprises means for processing the bands of individual audio segments with one or more functions in a band selected from the group consisting of the instance of concatenation, modification of frequency, duration, amplitude, and spectrum.

31. The device according to claim 19 wherein the concatenation means (111) sets the instance of concatenation where at least two bands are in agreement with respect to one or more properties of the group of properties consisting of zero point, amplitude, gradients, derivatives of any degree, spectra, tone levels, amplitude values within a frequency band, volume, style of speech, and emotion of speech.

32. The device according to claim 19 characterized in that wherein the segment providing means includes audio segments with bands, each of which reproduces at least a portion of a sound or phone, respectively, a sound or phone, respectively, portions of phone sequences or polyphones, respectively, or sound sequences or polyphones, respectively.

33. The device according to claim 19 wherein the concatenation means (111) generates synthesized voice data by means of the concatenation of audio segments.

34. The device according to claim 19 wherein further comprising means (117) for converting synthesized acoustical data to acoustical signals and/or voice signals.

35. A data carrier which includes a computer program for the co-articulation specific concatenation of audio segments in order to generate synthesized acoustical data which reproduces a sequence of concatenated phones, wherein each sound/phone comprises three bands including an initial co-articulation band, a solo articulation band and a final co-articulation band, and each segment comprises one or more bands of a sound/phone, comprising the following steps:

establishing an earlier audio segment with at least a portion of one band of a sound/phone selected for including an instance of concatenation;

establishing a later audio segment with the rest of the portions of the bands of the selected sound/phone wherein at least one of the earlier or later audio segments comprises bands of at least two adjacent sounds/phones, and wherein the solo articulation band of the selected sound/phone is at the trailing end of the earlier segment or at the leading end of the later segment and at least part of one of the co-articulation bands of the selected sound/phone is adjacent to the solo articulation band; and concatenating the two audio segments whereby the concatenated audio segments comprise at least three bands of two adjacent sounds/phones.

36. The data carrier of claim 35 wherein the solo articulation band of the selected sound/phone is at the leading edge of the later audio segment and the final co-articulation band of the selected sound/phone is adjacent to the solo articulation band.

37. The data carrier of claim 35 wherein the solo articulation band of the selected sound/phone is at the trailing edge of the earlier audio segment and the final co-articulation band of the selected sound/phone is at the leading edge of the later audio segment.

38. The data carrier of claim 35 wherein at least a portion of one of the co-articulation bands of the selected sound/phone is disposed at an end of one of the segments and is opposite the solo articulation band at the end of the other segment.

39. The data carrier of claim 35 wherein the leading band of the later audio segment reproduces a static sound and the two audio segments are concatenated by overlapping the opposite, adjacent solo and co-articulation bands of the selected sound/phone with each other where the transfer function and the length of overlap are determined by acoustical data in the two segments.

40. The data carrier according to claim 39 wherein the static phones include vowels, diphthongs, liquids, vibrants, fricatives and nasals.

41. The data carrier of claim 35 wherein the band in the leading edge of the later audio segment reproduces a dynamic sound and the two audio segments are concatenated in a non-overlapping manner each other with the transfer function determined by acoustical data in the two segments.

42. The data carrier according to claim 41 wherein the dynamic phones include plosives, affricates, glottal stops, and click sounds.

43. The data carrier according to claim 35 wherein the initial co-articulation band of the selected sound/phone is disposed in the earlier audio segment and reproduces the properties of the start of the selected sound/phone sequence.

44. The data carrier according to claim 35 wherein the final co-articulation band of the selected sound/phone is disposed in the later audio segment and reproduces the properties of the end of the selected sound/phone sequence.

45. The data carrier according to claim 35 wherein voice data to be synthesized is combined in groups and each group comprises one or more individual audio segments.

46. The data carrier according to claim 35 wherein an audio segment is established for the later audio segment band comprises the highest number of successive portions of the sounds/phones of the sound/phone sequence in order to use the smallest number of audio segment bands in the generation of the synthesized acoustical data.

47. The data carrier according to claim 35 wherein the bands of the individual audio segments are processed in accordance with properties of the concatenated sound/phone sequence and wherein said properties include one or more of the group consisting of a modification of frequency, duration, amplitude, and spectrum.

48. The data carrier according to claim 35 wherein the bands of individual audio segments are processed in accordance with properties of the selected band wherein the instance of concatenation lies, with these properties including one or more of the group of properties consisting of frequency, duration, amplitude, and spectrum.

49. The data carrier according to claim 35 wherein the instance of concatenation is set in the bands of the selected sound/phone where at least two bands are in agreement with respect to one or more properties of the group of properties consisting of zero point, amplitude, gradients, derivatives of any degree, spectra, tone levels, amplitude values within a frequency band, volume, style of speech, and emotion of speech.

50. The data carrier according to claim 35 wherein data to be synthesized comprises voice data, and the sounds are phones.

51. The data carrier according to claim 35 wherein the synthesized data is converted to acoustical signals and/or voice signals.

52. The data carrier of claim 35 wherein the instance of concatenation is disposed within or at an end of one of the co-articulation bands.

53. The data carrier of claim 35 wherein data is stored as acoustical data, optical data, magnetic data or electrical data.

54. The data carrier of claim 53 wherein a group of the audio segments reproduces sounds or phones, respectively, or portions of sounds or phones, respectively.

55. The data carrier of claim 53 wherein a group of the audio segments reproduces phone sequences or portions of phone sequences or polyphones, respectively, or portions of polyphones.

56. A synthesized voice signal comprising a sequence of sounds or phones with the voice signals comprising segments of sounds to reproduce a sequence of concatenated sounds/phones wherein each sound/phone comprises three bands including an initial co-articulation band, a solo articulation band and a final co-articulation band, and each segment comprises one or more bands of a sound, said synthesized voice signals comprising:

at least two audio segments concatenated for providing the synthesized voice signal, said two audio segments including an earlier audio segment with at least a part of one band of a sound/phone selected for including an instance of concatenation and a later audio segment with the rest of the portions and bands of the selected sound/phone wherein at least one of the earlier or later audio segments comprises bands of at least two adjacent sounds/phones, and wherein the solo articulation band of the selected sound/phone is at the trailing end of the earlier segment or at the leading end of the later segment and at least part of one of the co-articulation bands of the selected sound/phone is adjacent to the solo articulation band and the two audio segments are concatenated to provide the synthesized voice signal, whereby the concatenated audio segments comprise at least three bands of two adjacent sounds/phones.

57. The synthesized voice signal of claim 56 wherein the solo articulation band of the selected sound/phone is at the leading edge of the later audio segment and the final co-articulation band of the selected sound/phone is adjacent to the solo articulation band.

58. The synthesized voice signal of claims 56 wherein the solo articulation band of the selected sound/phone is at the trailing edge of the earlier audio segment and the final co-articulation band of the selected sound/phone is at the leading edge of the later audio segment.

59. The synthesized voice signal of claim 56 wherein at least a portion of one of the co-articulation bands of the selected sound/phone is disposed at an end of one of the segments and is opposite the solo articulation band at the end of the other segment.

60. The synthesized voice signal of claim 56 wherein the leading band of the later audio segment reproduces a static sound and the two audio segments are concatenated by overlapping the opposite, adjacent solo and co-articulation bands of the selected sound/phone with each other where the transfer function and the length of overlap are determined by acoustical data in the two segments.

61. The method according to claim 60 wherein the static phones include vowels, diphthongs, liquids, vibrants, fricatives and nasals.

62. The synthesized voice signal of claim 56 wherein the band in the leading edge of the later audio segment reproduces a dynamic sound and the two audio segments are concatenated in a non-overlapping manner each other with the transfer function determined by acoustical data in the two segments.

63. The synthesized voice signal of claim 62 wherein the dynamic phones include plosives, affricates, glottal stops, and click sounds.

64. The synthesized voice signal of claim 56 wherein the initial co-articulation band of the selected sound/phone is disposed in the earlier audio segment and reproduces the properties of the start of the selected sound/phone sequence.

65. The synthesized voice signal of claim 56 wherein the final co-articulation band of the selected sound/phone is disposed in the later audio segment and reproduces the properties of the end of the selected sound/phone sequence.

66. The synthesized voice signal of claim 56 wherein voice data to be synthesized is combined in groups and each group comprises one or more individual audio segments.

67. The synthesized voice signal of claim 56 wherein an audio segment is established for the later audio segment band comprises the highest number of successive portions of the sounds/phones of the sound/phone sequence in order to use the smallest number of audio segment bands in the generation of the synthesized acoustical data.

68. The synthesized voice signal of claim 62 wherein the acoustical data to be synthesized comprises voice data, and the sounds are phones.

69. The synthesized voice signal of claim 62 wherein the synthesized acoustical data is converted to acoustical signals and/or voice signals.

70. The synthesized voice signal of claim 62 wherein the instance of concatenation is disposed within or at an end of one of the co-articulation bands.

* * * * *